United States Patent
Chen et al.

(10) Patent No.: US 12,253,613 B2
(45) Date of Patent: Mar. 18, 2025

(54) METHOD AND DEVICE FOR DETERMINING ARRIVAL TIME, TERMINAL DEVICE, AND STORAGE MEDIUM

(71) Applicant: ZTE CORPORATION, Shenzhen (CN)

(72) Inventors: Shijun Chen, Shenzhen (CN); Dawei Chen, Shenzhen (CN); Yang Wang, Shenzhen (CN); Junqiang Li, Shenzhen (CN); Qian Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 442 days.

(21) Appl. No.: 17/783,828

(22) PCT Filed: Dec. 23, 2020

(86) PCT No.: PCT/CN2020/138464
§ 371 (c)(1),
(2) Date: Jun. 9, 2022

(87) PCT Pub. No.: WO2021/196765
PCT Pub. Date: Oct. 7, 2021

(65) Prior Publication Data
US 2023/0003829 A1    Jan. 5, 2023

(30) Foreign Application Priority Data
Apr. 1, 2020    (CN) .......................... 202010251399.6

(51) Int. Cl.
*G01S 5/02*    (2010.01)
(52) U.S. Cl.
CPC ........ *G01S 5/02216* (2020.05); *G01S 5/0215* (2013.01)

(58) Field of Classification Search
CPC ...... G01S 5/02216; G01S 5/0215; G01S 5/06; G01S 5/0218; G01S 5/10; G01S 5/14
See application file for complete search history.

(56) References Cited

U.S. PATENT DOCUMENTS 6,900,753 B2 *   5/2005   Tsunehara ............... G01S 1/045
                                                                342/146
7,737,893 B1 *   6/2010   Furman .................. G01S 5/0218
                                                                342/464

(Continued)

FOREIGN PATENT DOCUMENTS

CN        1592434 A        3/2005
CN       102238726 A       11/2011
(Continued)

OTHER PUBLICATIONS

Intellectual Property India. Examination Report for IN Application No. 202227034731 and English translation, mailed Nov. 10, 2022, pp. 1-6.

(Continued)

*Primary Examiner* — Cassi J Galt
(74) *Attorney, Agent, or Firm* — Vivacqua Crane, PLLC (57) ABSTRACT

A method and device for determining a time of arrival (TOA), a terminal device, and a non-transitory computer-readable storage medium are disclosed. The method may include: determining a detection start time on a correlation waveform based on a leading edge detection threshold; determining a noise threshold on the correlation waveform, and determining a quasi-TOA according to the detection start time; and determining the TOA according to data information in a target area of the correlation waveform and the noise threshold, where the target area is determined based on the quasi-TOA and a detection length.

13 Claims, 5 Drawing Sheets

(56) References Cited

U.S. PATENT DOCUMENTS

| | | |
|---|---|---|
| 2008/0130794 A1 | 6/2008 | Chong et al. |
| 2012/0309415 A1 | 12/2012 | Rhoads |
| 2013/0129006 A1 | 5/2013 | Kumar Reddy et al. |
| 2016/0179748 A1 | 6/2016 | Weill |
| 2018/0042025 A1 | 2/2018 | Opshaug et al. |

FOREIGN PATENT DOCUMENTS

| | | |
|---|---|---|
| CN | 106879068 A | 6/2017 |
| CN | 108923860 A | 11/2018 |
| CN | 111901274 A | 11/2020 |
| EP | 1167993 A2 | 1/2002 |
| WO | 2014089040 A1 | 6/2014 |

OTHER PUBLICATIONS

Dardari, et al. "Threshold-Based Time-of-Arrival Estimators in UWB Dense Multipath Channels," IEEE Transactions on Communications, vol. 56, No. 8, Aug. 2008, pp. 1366-1378.

International Searching Authority. International Search Report and Written Opinion for PCT Application No. PCT/CN2020/138464 and English translation, mailed Mar. 22, 2021, pp. 1-12.

European Patent Office. Extended European Search Report for EP Application No. 20928202.9, mailed May 29, 2024, pp. 1-8.

\* cited by examiner

METHOD AND DEVICE FOR DETERMINING ARRIVAL TIME, TERMINAL DEVICE, AND STORAGE MEDIUM

CROSS-REFERENCE TO RELATED APPLICATION

This application is a national stage filing under 35 U. S.C. § 371 of international application number PCT/CN2020/138464, filed Dec. 23, 2020, which claims priority to Chinese patent application No. 202010251399.6, filed on Apr. 1, 2020. The contents of these applications are incorporated herein by reference in their entirety.

TECHNICAL FIELD

The present disclosure relates to the field of communications, for example, to a method and apparatus for determining a time of arrival, a terminal device and a non-transitory computer-readable storage medium.

BACKGROUND

The 4th-generation (4G) and 5G wireless systems are orthogonal frequency division multiplexing (OFDM) systems, which are communication systems based on fast Fourier transform (FFT).

Communication network positioning may be realized based on cell identifier (CID), received signal strength indicator (RSSI), time difference of arrival (TDOA), etc. High-precision positioning is usually realized by the TDOA method.

However, the above methods cannot overcome the influence of noise in a complex multipath environment, and may introduce big errors, thus affecting positioning precision.

SUMMARY

The present disclosure provides a method and apparatus for determining a time of arrival (TOA), a terminal device, and a non-transitory computer-readable storage medium.

An embodiment of the present disclosure provides a method for determining a TOA, which may include: determining a detection start time on a correlation waveform based on a leading edge detection threshold; determining a noise threshold on the correlation waveform, and determining a quasi-TOA according to the detection start time; and determining the TOA according to data information in a target area of the correlation waveform and the noise threshold; where the target area is determined based on the quasi-TOA and a detection length.

A further embodiment of the present disclosure provides an apparatus for determining a TOA, which may include: a detection start time determination module configured to determine a detection start time on a correlation waveform based on a leading edge detection threshold; a quasi-TOA determination module configured to determine a noise threshold on the correlation waveform, and determine a quasi-TOA according to the detection start time, the quasi-TOA being earlier than the detection start time; and a TOA determination module configured to determine the TOA according to data information in a target area of the correlation waveform and the noise threshold; where the target area is determined based on the quasi-TOA and a detection length.

A further embodiment of the present disclosure provides a terminal device, which may include: at least one processor; and a storage apparatus, configured to store at least one program, where the at least one program, when executed by the at least one processor, causes the at least one processor to implement any of the methods according to the embodiments of the present disclosure.

A further embodiment of the present disclosure provides a non-transitory computer-readable storage medium storing a computer program which, when executed by a processor, causes the processor to implement any of the methods according to the embodiments of the present disclosure.

DETAILED DESCRIPTION

The embodiments of the present disclosure will be described below with reference to the accompanying drawings.

The steps shown in the flowcharts of the drawings may be performed in a computer system, such as with a set of computer-executable instructions. Moreover, although a logical order is shown in the flowcharts, the steps shown or described may be performed, in some cases, in a different order from the order shown or described herein.

Figure 1:
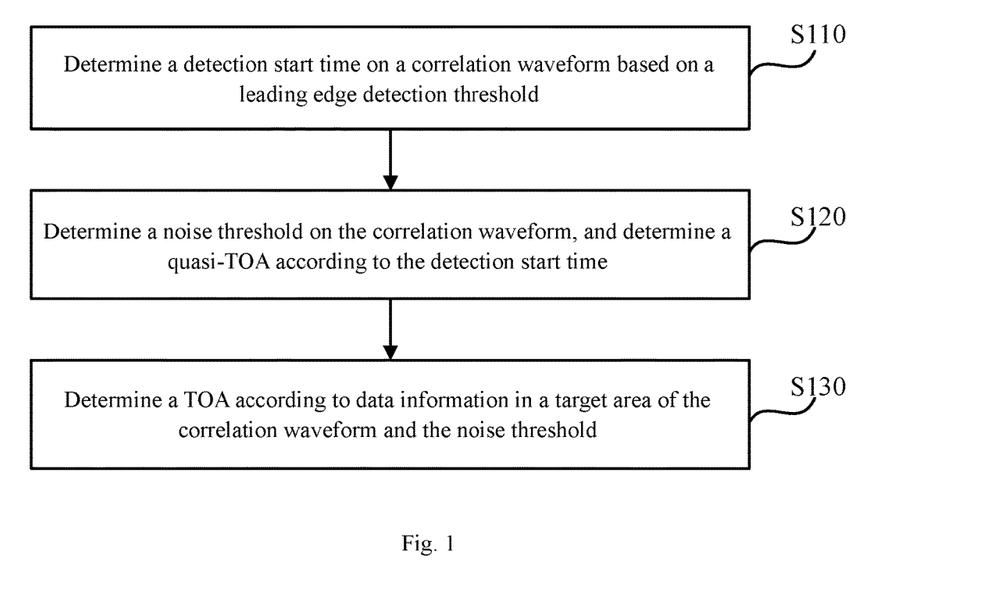
FIG. 1 is a flowchart of a method for determining a time of arrival (TOA) provided by the present disclosure.

In an illustrative implementation, FIG. 1 is a flowchart of a method for determining a time of arrival (TOA) provided by the present disclosure, which can be applied to TOA determination. The method may be executed by an apparatus for determining a TOA, which is integrated in a terminal device, and the terminal device may be a positioning terminal device, such as a terminal device which receives an orthogonal frequency division multiplexing (OFDM) signal sent by a base station and performs positioning.

When an existing technology is used for measuring the TOA, after analog digital (AD) sampling at a receiver, synchronous channel detection is performed, and after a radio frame header is determined, cyclic prefix (CP) removal is performed on each symbol of each subframe, and then fast Fourier transform (FFT) is performed. After receiving AD data, performing synchronous channel detection, defining OFDM symbols, removing a CP, and then correlating a received signal with a local signal, the TOA is obtained by solving a correlation function.

A time difference of arrival (TDOA) method based on a communication network includes: defining OFDM symbols after a frame header is determined, removing a fixed number of sampling points from a defined time point according to a CP length to obtain time-domain data of the OFDM symbols, then directly performing a mathematical sequence correlation operation, taking the first maximum correlation peaks as TOAs, obtaining TDOAs based on the TOAs, and then obtaining position information through calculation based on the TDOAs.

Figure 1A:
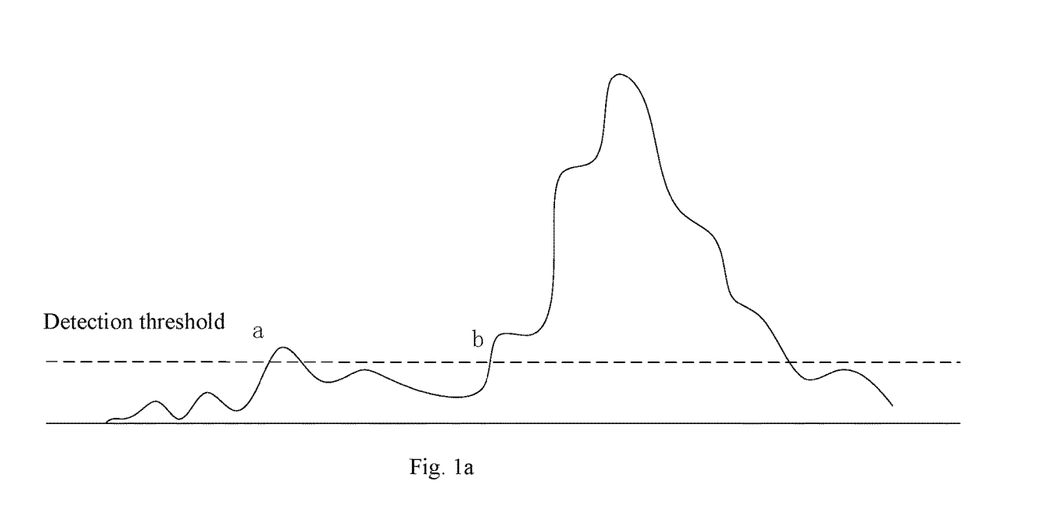
FIG. 1a is a schematic diagram provided by the present disclosure, showing an influence of noise on leading edge detection.

In a complex multipath environment such as an indoor space and a dense urban area, noise and multiple paths will lead to very big errors. In a leading edge detection method, a threshold is usually set according to a noise level, based on which threshold a signal leading edge is found, and then an earliest TOA of a signal is measured. Due to the fluctuation of the actual noise level, when noise is loud at a certain moment during actual detection, the noise may be mistaken for a signal, resulting in significant errors in detection. FIG. 1a is a schematic diagram of an influence of noise on leading edge detection provided by the present disclosure. As shown in FIG. 1a, a noise detection threshold, namely detection threshold, is determined in one interval; however, as noise changes as a function of time, the noise level may be high over a certain time period in another interval, causing point a to be mistaken for a TOA measurement result, which should have been point b instead.

In order to overcome an influence of actual noise on TOA measurement, the present disclosure proposes a method for determining a TOA to solve the technical problem of TOA measurement errors in a noisy environment. As shown in FIG. 1, the present disclosure provides a method for determining a TOA, including the following steps.

At S110, a detection start time on a correlation waveform is determined based on a leading edge detection threshold.

The leading edge detection threshold may be considered as a threshold used for determining the detection start time. The way of determining the leading edge detection threshold is not specified here, and the threshold may be determined experimentally according to the actual situation or may be an empirical value. The correlation waveform may be considered as a waveform for determining the TOA. The correlation waveform may be determined based on a received orthogonal frequency division multiplexing (OFDM) signal and a local signal, where signal parameters for generating the local signal are the same as those for generating the OFDM signal. The detection start time may be considered as a start time point for detection in determination of the TOA.

To determine the TOA, in this step, amplitudes of points on the correlation waveform may be compared with the leading edge detection threshold to determine the detection start time. For example, a time of a data point with an amplitude equal to the leading edge detection threshold is determined as the detection start time, or a time of a data point with an amplitude greater or smaller than the leading edge detection threshold by a preset value is determined as the detection start time. The preset value is not specified here and may be determined according to the actual situation.

At S120, a noise threshold is determined on the correlation waveform, and a quasi-TOA is determined according to the detection start time.

The noise threshold may be considered as a numerical value used for detecting a noise level. In this embodiment, determination of the detection start time and the noise threshold is not limited to a specific sequential order. The noise threshold may be determined based on an amplitude in a preset area on the correlation waveform. The preset area may be randomly determined, or may be a noise detection interval determined based on a maximum amplitude in the correlation waveform. The noise detection interval may be an interval on the correlation waveform determined based on time, a distance between a maximum time in the noise detection interval and a time corresponding to the maximum amplitude is greater than or equal to a predetermined distance, and a length of the noise detection interval is a predetermined length. Numerical values of the predetermined distance and the predetermined length are not specified here and may be determined according to the actual situation. When determining the noise threshold, an average value or a maximum value of amplitudes of various data points in the preset area may be determined as the noise threshold.

The quasi-TOA may be considered as a preliminarily determined TOA. In this embodiment, it is necessary to analyze the correlation waveform before the quasi-TOA to determine the TOA.

In this step, the quasi-TOA may be determined based on the detection start time, for example, a time earlier than the detection start time on the correlation waveform is determined as the quasi-TOA, or a time of a latest extreme point on the correlation waveform that is earlier than the detection start time is determined as the quasi-TOA. The first extreme point is a latest extreme point on the correlation waveform at a time earlier than the detection start time. For another example, a time of a latest extreme point on the correlation waveform at a time earlier than the detection start time and with an amplitude smaller than the noise threshold is determined as the quasi-TOA, that is, a time corresponding to a second extreme point is determined as the quasi-TOA. The second extreme point is a latest extreme point on the correlation waveform at a time earlier than the detection start time and with an amplitude smaller than the noise threshold.

At S130, the TOA is determined according to data information in a target area of the correlation waveform and the noise threshold.

The target area may be determined based on the quasi-TOA and a detection length. The target area may be considered as an area for determining whether to continue to detect the correlation waveform in a time decreasing direction. By analyzing the correlation waveform in the target area, the TOA is determined. The detection length may be considered as a length of the target area. The detection length may be 2-4 sampling periods. The data information may be considered as data on the correlation waveform, such as an amplitude change rate, amplitude and/or time of a data point on the correlation waveform.

In an embodiment, in this step, the TOA may be determined by comparing an amplitude of a data point in the target area with the noise threshold; or in this step, the TOA may be determined by comparing the amplitude of the data point in the target area with the noise threshold and considering the amplitude change rate; or in this step, the TOA may be determined by comparing the amplitude of the data point in the target area with the noise threshold and considering whether a maximum data point is an extreme point, the maximum data point being a data point with a largest amplitude in the target area of the correlation waveform.

For example, to determine the TOA, an OFDM symbol may be received first, then a correlation operation is performed on the OFDM symbol and a local signal to obtain the correlation waveform, and the leading edge detection threshold is used for determining the detection start time; and the latest extreme point smaller than the noise threshold is searched for backward from the detection start time, the time of the first extreme point is taken as the quasi-TOA, it is determined whether there is any data point exceeding the noise threshold in the target area before the quasi-TOA, and if so, a latest extreme point smaller than the noise threshold is further searched for backward and taken as a new quasi-TOA. If not, the quasi-TOA is determined as the TOA.

The method for determining the TOA provided by the present disclosure includes: determining a detection start time on a correlation waveform based on a leading edge detection threshold; determining a noise threshold on the correlation waveform, and determining a quasi-TOA according to the detection start time; and determining the TOA according to data information in a target area of the correlation waveform and the noise threshold; where the target area is determined based on the quasi-TOA and a detection length. Using this method, errors of TOA measurement caused by noise are reduced, and the precision of TOA measurement is improved.

On the basis of the foregoing embodiment, a modified embodiment of the foregoing embodiment is proposed. For simplified description, only differences from the foregoing embodiment are described in the modified embodiment.

In an embodiment, determining a detection start time on a correlation waveform based on a leading edge detection threshold includes: identifying target data points having an amplitude equal to the leading edge detection threshold on the correlation waveform; and determining a minimum time in the identified target data points as the detection start time.

The target data point may be considered as a data point with an amplitude equal to the leading edge detection threshold on the correlation waveform. After the target data points are identified, the minimum time may be selected from the identified target data points, and the minimum time may be determined as the detection start time.

In an embodiment, determining a noise threshold on the correlation waveform includes: determining a maximum amplitude in the correlation waveform; determining a noise detection interval in the correlation waveform, the noise detection interval being an interval determined on the correlation waveform based on time, and a distance between a maximum time in the noise detection interval from a time corresponding to the maximum amplitude being greater than or equal to a predetermined distance, and a length of the noise detection interval is a predetermined length; and determining the noise threshold according to signal amplitudes of the noise detection interval.

When determining the noise threshold, in order to improve the precision of noise threshold determination, a noise detection area may be determined based on the maximum amplitude in the correlation waveform, so that the noise threshold may be determined based on the noise detection interval.

The noise detection interval may be a time interval on the correlation waveform. The distance between a right end point of the noise detection interval, that is, the maximum time in the noise detection interval from the time corresponding to the maximum amplitude may be greater than or equal to the predetermined distance, so as to ensure that the noise detection interval is far enough away from a highest point on the correlation waveform. The maximum amplitude may be considered as an amplitude of the highest point on the correlation waveform. The time corresponding to the maximum amplitude may be considered as a time corresponding to the highest point on the correlation waveform.

After the noise detection interval is determined, the noise threshold may be determined based on the signal amplitudes of the correlation waveform in the noise detection interval, for example, an average value or a maximum value of the signal amplitudes of the correlation waveform in the noise detection interval is determined as the noise threshold.

In an embodiment, the quasi-TOA is a time corresponding to a first extreme point on the correlation waveform, the first extreme point being a latest extreme point on the correlation waveform at a time earlier than the detection start time; or the quasi-TOA is a time corresponding to a second extreme point on the correlation waveform, the second extreme point being a latest extreme point on the correlation waveform at a time earlier than the detection start time and with an amplitude smaller than the noise threshold.

In an embodiment, determining the TOA according to data information in a target area of the correlation waveform and the noise threshold includes: determining the data information in the target area of the correlation waveform, the data information including: at least one of the following attributes of a maximum data point: amplitude; amplitude change rate; or time, the maximum data point being a data point with a largest amplitude in the target area of the correlation waveform; determining the quasi-TOA as the TOA in response to the amplitude of the maximum data point being not greater than the noise threshold; and updating the quasi-TOA in response to the amplitude of the maximum data point being greater than the noise threshold, until there is no amplitude greater than the noise threshold in a target area corresponding to the updated quasi-TOA, and determining the updated quasi-TOA as the TOA.

When determining the TOA, the data information may be correlation information of the maximum data point, such as at least one of amplitude, amplitude change rate or time.

In response to the amplitude of the maximum data point being not greater than the noise threshold, it can be considered that there are no data points greater than the noise threshold in the target area, so the quasi-TOA can be determined as the TOA.

In response to the amplitude of the maximum data point being greater than the noise threshold, it can be considered that there are data points greater than the noise threshold in the target area, and the correlation waveform may be continuously analyzed in the time decreasing direction to determine a new quasi-TOA, until there is no amplitude greater than the noise threshold in a new target area corresponding to the new quasi-TOA. In response to there being no amplitude greater than the noise threshold in the new target area corresponding to the new quasi-TOA, the new quasi-TOA is determined as the TOA.

In an embodiment, updating the quasi-TOA includes: in response to the amplitude change rate at the maximum data point being negative, determining a target time on the correlation waveform as a new detection start time, the target time being a time corresponding to a third extreme point, and the third extreme point being a latest extreme point on the correlation waveform at a time earlier than the time corresponding to the maximum data point; in response to the amplitude change rate at the maximum data point being positive or the maximum data point being an extreme point, determining the time corresponding to the maximum data point as a new detection start time; and continuing to select the quasi-TOA to determine an updated quasi-TOA.

In response to the amplitude of the maximum data point being greater than the noise threshold and the amplitude change rate at the maximum data point being negative, directly determining a time of a latest extreme point on the correlation waveform at a time earlier than the maximum data point as the new detection start time.

In response to the amplitude of the maximum data point being greater than the noise threshold and the amplitude change rate at the maximum data point being positive or the maximum data point being an extreme point, determining the time corresponding to the maximum data point as the new detection start time.

After determining the new detection start time, the new quasi-TOA is determined, that is, a corresponding new target area, so as to continue to determine the TOA, which can be regarded as returning to S120. There is no need to determine the noise threshold when returning to S120.

In an embodiment, the target area is an interval extending from the quasi-TOA in a time decreasing direction and having a length equal to the detection length.

The numerical value of the detection length is not specified here and may be set according to the actual situation, such as 2-4 sampling periods.

The following is an illustrative description of the present disclosure. The method for determining the TOA provided by the present disclosure can be regarded as a leading edge detection-based TOA measurement method by first-path signal detection in a multipath environment, which can effectively solve the problem of high-precision first-path measurement in a complex wireless environment.

In an example, the TOA measurement method based on leading edge detection provided by the present disclosure includes the following steps.

At step 1, an OFDM signal is received, symbol data containing a positioning signal are extracted, a mathematical correlation operation is performed on the positioning signal and a local signal to obtain a correlation function waveform, namely the correlation waveform, and normalization is performed according to a modulus.

The received positioning signal may be a signal generated by a radio signal transmitting node, such as a base station, a positioning base station, etc., after encoding and modulating information such as a positioning signal identifier. As a receiver, a terminal device wirelessly receives the OFDM signal containing the positioning signal. The local signal can be considered as a signal generated by the terminal device locally using the same signal parameters as the radio signal transmitting node. Signal generation may be performed according to the 3rd generation partnership project (3GPP) standard.

At step 2, after obtaining the correlation function waveform, a noise level is detected in an area far from a highest point of the correlation function waveform, and a noise threshold is determined as a second detection threshold, that is, the noise threshold; on the correlation function waveform, a leading edge threshold may be configured according to prior knowledge as a first detection threshold, that is, the leading edge detection threshold; and on the correlation function waveform, a detection interval T may be configured according to prior knowledge as a third detection threshold, that is, the target area.

The area far from the highest point of the correlation function waveform can be considered as having a length of L, and a time difference between a rightmost time of the area and a time point corresponding to a highest amplitude point of the correlation function waveform exceeds the threshold 4. The thresholds 4 and L may be set according to the environment. L may be an integer.

Figure 2:
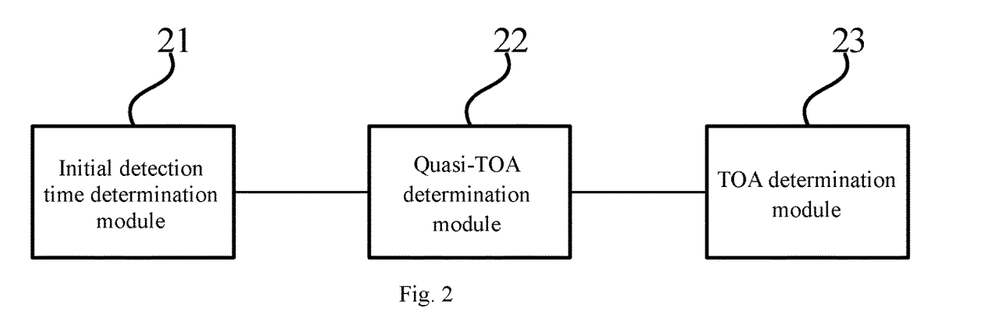
FIG. 2 is a schematic diagram of an apparatus for determining a TOA provided by the present disclosure.
Figure 2A:
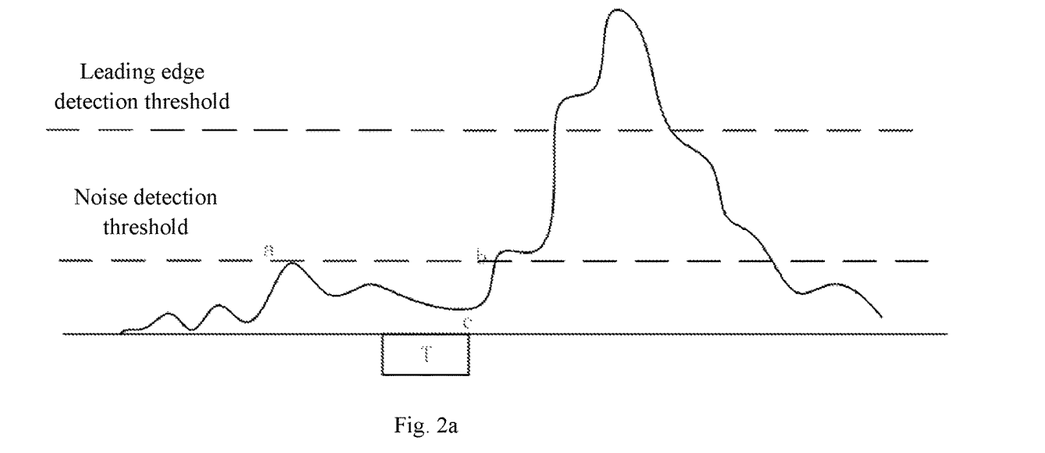
FIG. 2a is a schematic diagram of determining a detection threshold according to an embodiment of the present disclosure.

Detecting the noise level can be considered as taking a maximum or average value of signal amplitudes in the area with the length L. FIG. 2a is a schematic diagram of determining a detection threshold provided by an embodiment of the present disclosure. Referring to FIG. 2a, the leading edge detection threshold is used for determining a start point of first leading edge detection, and the noise detection threshold, that is, the noise threshold, can be considered as a value of the detected noise level. The third detection threshold, that is, the area shown by the interval T in the figure, is an interval range used for determining whether subsequent detection is required, and is generally set to 2-4 sampling periods Ts.

At step 3, a minimum time point equal to the first detection threshold is searched for on the correlation waveform at the beginning and taken as an initial detection start point. A time point c corresponding to a lowest point of a correlation signal modulus is searched for backward on the correlation waveform from the detection start point.

A technical means for determining the detection start time can be to search for a minimum time point equal to the first detection threshold on the correlation waveform and take the minimum time point as the detection start time. Point c in FIG. 2a is an example of the time point corresponding to the lowest point of the correlation signal modulus searched for backward on the correlation waveform from the detection start point. This point c can be a time point corresponding to a latest extreme point found through backward search from the detection start time, or a time point corresponding to a latest extreme point smaller than the noise threshold found through backward search from the detection start time.

The detection start time $T_{start}=\text{MIN}\{i|r_i>=\text{first detection threshold}\}$, where $r_i$ is an $i^{th}$ data point on the correlation waveform. That is, the detection start time may be a smallest time point among data points greater than or equal to the first detection threshold. The time point corresponding to the extreme point of the backward search correlation signal modulus can be $T_{min}=\text{MIN}(T|\forall i\in[T, T_{start}], r_i<r_{i+1}, T<T_{start})$. That is, a minimum T is determined, and an amplitude between the minimum T and the detection start time keeps decreasing.

At step 4, it is determined whether a maximum point in an area defined backward from the point c by the third detection threshold, i.e. a maximum data point, is greater than a point of the second detection threshold. In response to a positive determination result and the amplitude change rate at the maximum point of the area being positive or the maximum point of the area being an extreme point, this point is taken as a new detection start point, that is, a new detection start time; in response to a positive determination result and the amplitude change rate at the maximum point of the area being negative, an extreme point is obtained through backward search and taken as a new detection start point; and in response to a negative determination result, a time corresponding to the point c is taken as a TOA measurement value of the signal.

The maximum point in the area defined by the third detection threshold before the point c $r_{MAX}=\text{MAX}(r_i|i\in[t_{c-L}, t_c])$, where a time point corresponding to $r_{MAX}$ is $T_{MAX}$.

Figure 2B:
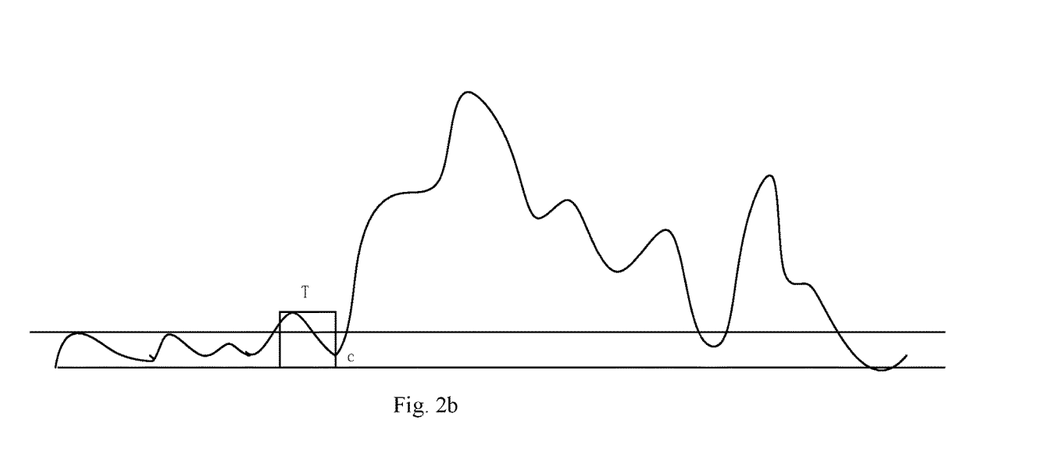
FIG. 2b is a schematic diagram of determining a TOA according to an embodiment of the present disclosure.

In response to $r_{MAX}$ being greater than the second detection threshold and the amplitude change rate at the maximum point of the area being positive or the maximum point of the area being an extreme point, this point is taken as a new detection start point. FIG. 2b is a schematic diagram of determining a TOA provided by an embodiment of the present disclosure. Referring to FIG. 2b, the maximum point of the area is an extreme point, and the maximum point of the area will be used as the new detection start time, so as to continue to determine the quasi-TOA based on the new detection start time until the TOA is determined.

Figure 2C:
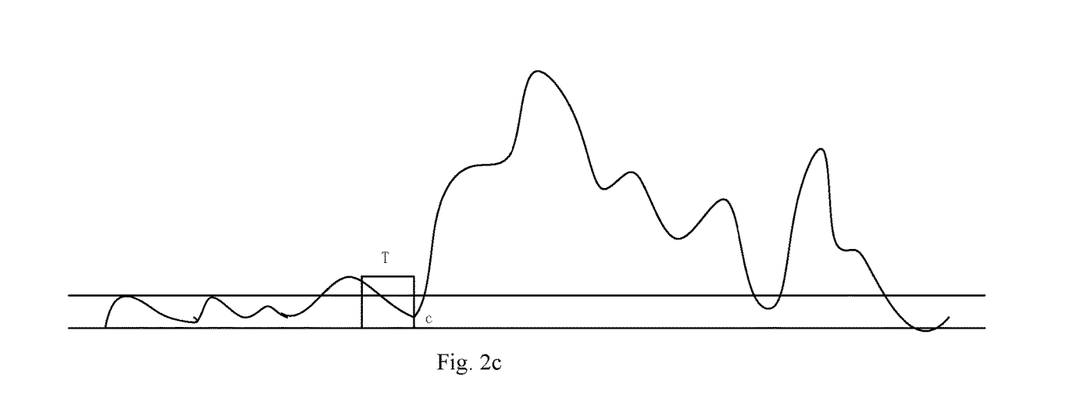
FIG. 2c is another schematic diagram of determining a TOA according to an embodiment of the present disclosure.

In response to $r_{MAX}$ being greater than the second detection threshold and the amplitude change rate at the maximum point of the area being negative, an extreme point is obtained through backward search and taken as a new detection start point. FIG. 2c is another schematic diagram of determining a TOA provided by an embodiment of the present disclosure. Referring to FIG. 2c, the amplitude change rate at the maximum point of the area is negative, so it is necessary to search backward from the maximum point of the area, that is, the maximum data point, for a latest extreme point which is taken as a new detection start time, so as to continue to determine the quasi-TOA based on the new detection start time until the TOA is determined.

Figure 2D:
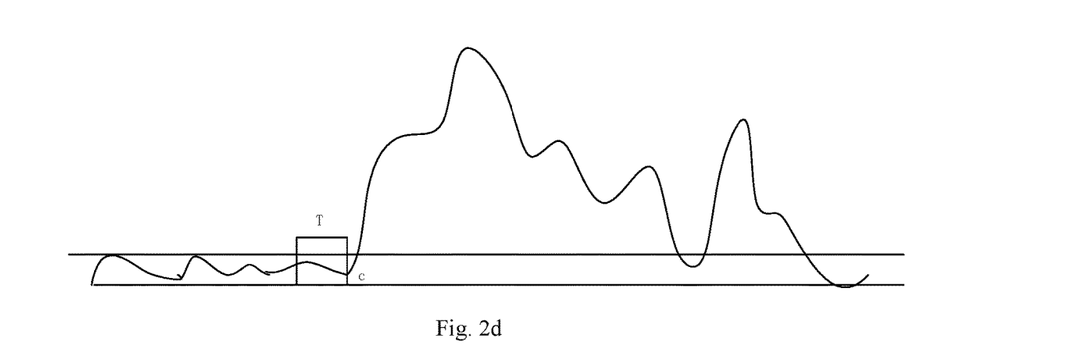
FIG. 2d is yet another schematic diagram of determining a TOA according to an embodiment of the present disclosure.

In response to $r_{MAX}$ being smaller than or equal to the second detection threshold, a time corresponding to the point c is taken as a TOA measurement value of the signal. FIG. 2d is yet another schematic diagram of determining a TOA provided by an embodiment of the present disclosure. Referring to FIG. 2d, the maximum point of the area is smaller than or equal to the second detection threshold, and the point c is the TOA.

In this example, the first detection threshold is used for determining the leading edge detection start time for the correlation waveform of the received signal, and the time point corresponding to the latest extreme value is searched for backward from the detection start time in the correlation waveform. In the area determined according to the third detection threshold before the extreme point in the correlation waveform, whether there are data points exceeding the second detection threshold is determined so as to determine whether to search backward. In response to the condition being not met, the time corresponding to the current extreme point is taken as the TOA, that is, there are no data points exceeding the second detection threshold when searching backward, and the time corresponding to the current extreme point is taken as the TOA. The method provided by this example reduces the errors of TOA measurement caused by noise, improves the communication function and positioning precision of a wireless system, and enhances the detection precision of a first path under the influence of multipath signals.

In an example, the positioning signal transmitted by the base station may be a 3GPP positioning reference signal (PRS), a bandwidth BW=100 M, a physical cell ID (PCI) may be 1, and a sampling period Ts=8 ns; an oversampling factor may be 30; a first detection threshold Thr1 is configured as 0.8 according to prior knowledge; a third detection threshold: T width is 150; and the terminal device receives the positioning signal and correlates the positioning signal with the local signal.

Figure 2E:
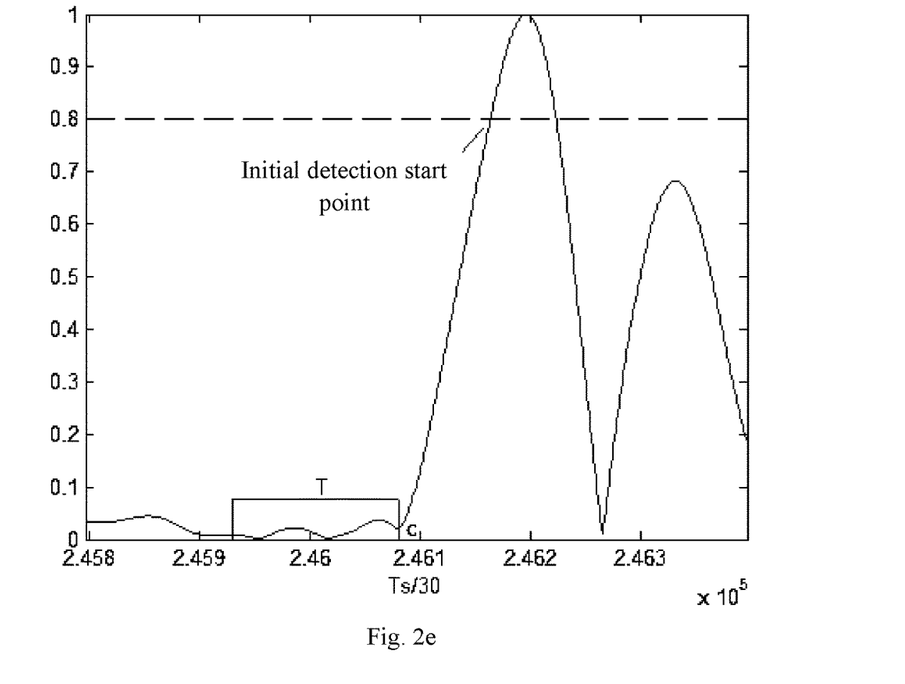
FIG. 2e is a schematic diagram of a correlation waveform provided by an embodiment of the present disclosure.

(1) The terminal device receives the positioning signal and correlates the positioning signal with the local signal. FIG. 2e is a schematic diagram of a correlation waveform provided by an embodiment of the present disclosure, and a normalized correlation waveform is shown in FIG. 2e.

(2) The first detection threshold Thr1 is used for determining an initial detection time point, that is, the detection start time.

(3) When the distance of the time point corresponding to the highest point of this group of correlation waveforms exceeds the threshold 4 (empirical value 5000) and an area length L=240000, an average noise value is obtained and taken as the second detection threshold Thr2.

(4) From the initial detection start point, that is, the detection start time, a latest extreme point smaller than the second detection threshold Thr2 is searched for backward to obtain the time point c.

(5) It is determined that there is no point exceeding the second threshold in the area T before c.

(6) The point c is the measured TOA of the signal.

In an example, the positioning signal transmitted by the base station may be a 3GPP PRS signal, a bandwidth BW=100 M, PCI=1, and a sampling period Ts=8 ns; an oversampling factor may be 30; a first detection threshold Thr1 is configured as 0.8 according to prior knowledge; a third detection threshold: T width is 150; and the terminal device receives the positioning signal and correlates the positioning signal with the local signal.

Figure 2F:
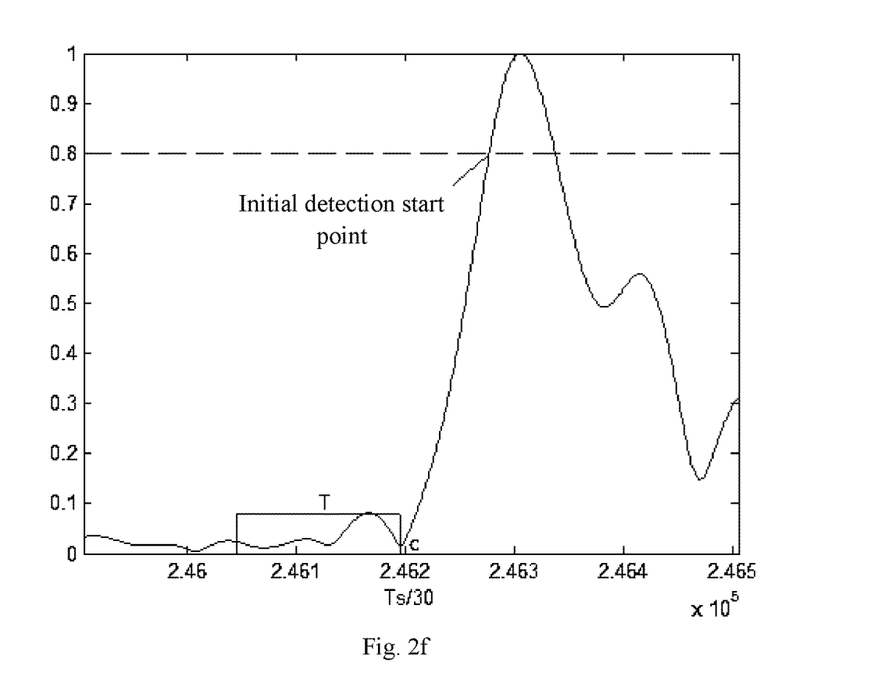
FIG. 2f is a schematic diagram of another correlation waveform provided by an embodiment of the present disclosure.

(1) The terminal device receives the positioning signal and correlates the positioning signal with the local signal. FIG. 2f is a schematic diagram of another correlation waveform provided by an embodiment of the present disclosure, and a normalized correlation waveform is shown in FIG. 2f.

(2) The first detection threshold Thr1 is used for determining an initial detection time point.

(3) When the distance of the time point corresponding to the highest point of this group of correlation waveforms exceeds the threshold 4 (empirical value 5000) and an area length L=240000, an average noise value is obtained and taken as the second detection threshold Thr2.

(4) From the initial detection start point, a latest extreme point smaller than the second threshold Thr2 is searched for backward to obtain the time point c.

Figure 2G:
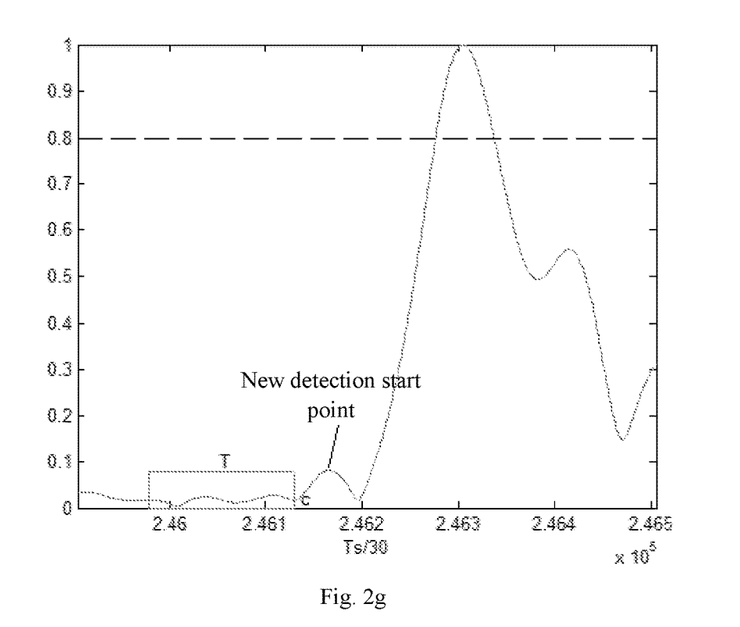
FIG. 2g is a schematic diagram of redetermining a detection start time according to an embodiment of the present disclosure.

(5) It is determined that there are points exceeding the second threshold in the area T before c, the amplitude change rate at the maximum point is positive, and this maximum point is taken as a new detection start point. FIG. 2g is a schematic diagram of redetermining a detection start time provided by an embodiment of the present disclosure. Referring to FIG. 2g, the maximum point is determined as the new detection start time.

(6) From the new detection start point, a latest extreme point smaller than the second detection threshold Thr2 is searched for backward to obtain the time point c.

(7) It is determined that there is no point exceeding the second detection threshold in the area T before c.

(8) The point c is the measured TOA of the signal.

The present disclosure further provides an apparatus for determining a TOA. FIG. 2 is a schematic diagram of an apparatus for determining a TOA provided by the present disclosure. The apparatus for determining a TOA in the embodiment of the present disclosure may be integrated on a terminal device. As shown in FIG. 2, the apparatus includes: a detection start time determination module 21 configured to determine a detection start time on a correlation waveform based on a leading edge detection threshold; a quasi-TOA determination module 22 configured to determine a noise threshold on the correlation waveform, and determine a quasi-TOA according to the detection start time, the quasi-TOA being earlier than the detection start time; and a TOA determination module 23 configured to determine the TOA according to data information in a target area of the correlation waveform and the noise threshold; where the target area is determined based on the quasi-TOA and a detection length.

The apparatus for determining a TOA provided in this embodiment is used for implementing the method for determining a TOA provided by the embodiments of the present disclosure. The implementation principles and technical effects of the apparatus for determining a TOA provided in this embodiment are similar to those of the method for determining a TOA provided by the embodiments of the present disclosure, and are not repeated here.

On the basis of the foregoing embodiment, a modified embodiment of the foregoing embodiment is proposed. For simplified description, only differences from the foregoing embodiment are described in the modified embodiment.

In an embodiment, the detection start time determination module 21 is specifically configured to: identify target data points having an amplitude equal to the leading edge detection threshold on the correlation waveform; and determine a minimum time in the identified target data points as the detection start time.

In an embodiment, the quasi-TOA determination module 22 is specifically configured to: determine a maximum amplitude in the correlation waveform; determine a noise detection interval in the correlation waveform, the noise detection interval being an interval determined on the correlation waveform based on time, and a distance between a maximum time in the noise detection interval from a time corresponding to the maximum amplitude being greater than or equal to a predetermined distance, and a length of the noise detection interval is a predetermined length; and determine the noise threshold according to signal amplitudes of the noise detection interval.

In an embodiment, the quasi-TOA is a time corresponding to a first extreme point on the correlation waveform, the first extreme point being a latest extreme point on the correlation waveform at a time earlier than the detection start time; or the quasi-TOA is a time corresponding to a second extreme point on the correlation waveform, the second extreme point being a latest extreme point on the correlation waveform at a time earlier than the detection start time and with an amplitude smaller than the noise threshold.

In an embodiment, the TOA determination module 23 is specifically configured to: determine the data information in the target area of the correlation waveform, the data information including: at least one of the following attributes of a maximum data point: amplitude; amplitude change rate; or time, the maximum data point being a data point with a largest amplitude in the target area of the correlation waveform; determine the quasi-TOA as the TOA in response to the amplitude of the maximum data point being not greater than the noise threshold; and update the quasi-TOA in response to the amplitude of the maximum data point being greater than the noise threshold, until there is no amplitude greater than the noise threshold in a target area corresponding to the updated quasi-TOA, and determine the updated quasi-TOA as the TOA.

In an embodiment, updating the quasi-TOA by the TOA determination module 23 includes: in response to the amplitude change rate at the maximum data point being negative, determining a target time on the correlation waveform as a new detection start time, the target time being a time corresponding to a third extreme point, and the third extreme point being a latest extreme point on the correlation waveform at a time earlier than the time corresponding to the maximum data point; in response to the amplitude change rate at the maximum data point being positive or the maximum data point being an extreme point, determining the time corresponding to the maximum data point as a new detection start time; and continuing to select the quasi-TOA to determine an updated quasi-TOA.

In an embodiment, the target area is an interval extending from the quasi-TOA in a time decreasing direction and having a length equal to the detection length.

Figure 3:
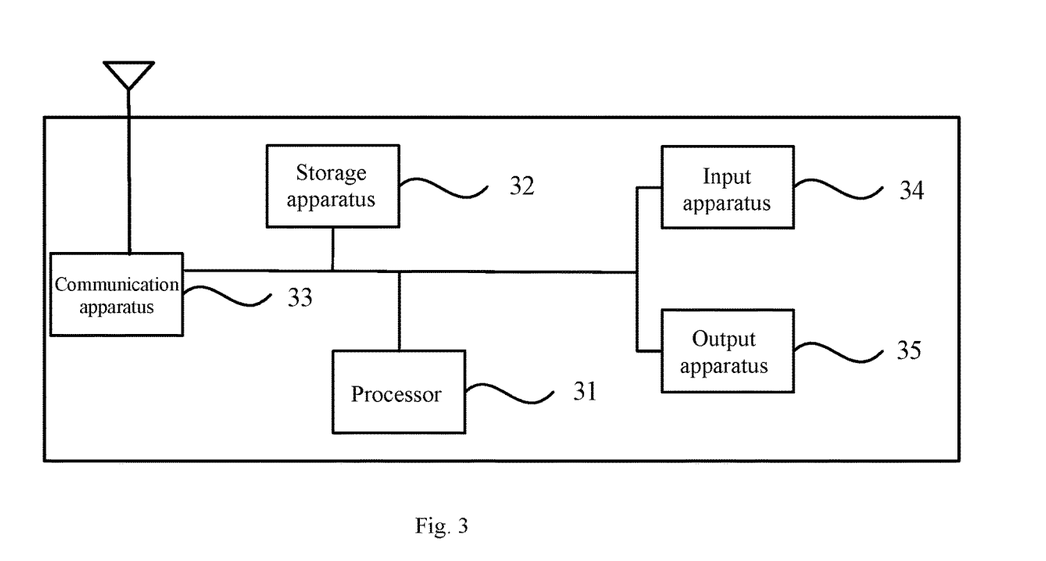
FIG. 3 is a schematic diagram of a terminal device provided by the present disclosure.

A further embodiment of the present disclosure provides a terminal device. FIG. 3 is a schematic diagram of a terminal device provided by the present disclosure. As shown in FIG. 3, the terminal device provided by the present disclosure includes at least one processor 31 and a storage apparatus 32. The terminal device may be provided with one or more processors 31, while one processor 31 is shown as an example in FIG. 3. The storage apparatus 32 is configured to store at least one program, where the at least one program, when executed by the at least one processor 31, causes the at least one processor 31 to implement the method for determining time of arrival according to the embodiments of the present disclosure.

The terminal device further includes: a communication apparatus 33, an input apparatus 34 and an output apparatus 35.

The processor 31, the storage apparatus 32, the communication apparatus 33, the input apparatus 34, and the output apparatus 35 in the terminal device may be connected by a bus or other means. In FIG. 3, the connection is realized by a bus.

The input apparatus 34 may be configured to receive input digital or character information and generate key signal inputs related to user settings and function control of the terminal device. The output apparatus 35 may include a display device such as a display screen.

The communication apparatus 33 may include a receiver and a transmitter. The communication apparatus 33 is configured to transmit and receive information according to control of the processor 31.

As a computer-readable storage medium, the storage apparatus 32 may be configured to store software programs, computer executable programs and modules, such as program instructions/modules corresponding to the method for determining a TOA described in the embodiments of the present disclosure (for example, the detection start time determination module 21, the quasi-TOA determination module 22 and the TOA determination module 23 in the apparatus for determining a TOA). The storage apparatus 32 may include a storage program area and a storage data area, where the storage program area may store an operating system and application program(s) required by at least one function, and the storage data area may store data created according to the use of a terminal device, etc. In addition, the storage apparatus 32 may include a high-speed random access memory and a non-volatile memory, for example, at least one magnetic disk storage device, a flash memory device, or another non-volatile solid-state storage device. In some examples, the storage apparatus 32 may include memories remotely located with respect to the processor 31, and these remote memories may be connected to terminal devices via a network. Examples of the above-mentioned network include the Internet, an intranet, a local area network, a mobile communication network, and a combination thereof.

A further embodiment of the present disclosure provides a computer-readable storage medium storing a computer program which, when executed by a processor, causes the processor to implement the method for determining a TOA according to any of the embodiments of the present disclosure. The method includes: determining a detection start time on a correlation waveform based on a leading edge detection threshold; determining a noise threshold on the correlation waveform, and determining a quasi-TOA according to the detection start time; and determining the TOA according to data information in a target area of the correlation waveform and the noise threshold; where the target area is determined based on the quasi-TOA and a detection length.

The computer storage medium of this embodiment may be any combination of one or more computer-readable media. The computer-readable medium may be a computer-readable signal medium or a computer-readable storage medium. For example, the computer-readable storage medium may be, but is not limited to, electrical, magnetic, optical, electromagnetic, infrared, or semiconductor system, an apparatus or a device, or any combination thereof. Examples of the computer-readable storage medium (a non-exhaustive list thereof) include: an electrical connection with one or more wires, a portable computer disk, a hard disk, a Random Access Memory (RAM), a Read-Only Memory (ROM), an erasable programmable read-only memory, EPROM), a flash memory, an optical fiber, a Compact Disc Read-Only Memory (CD-ROM), an optical storage device, a magnetic storage device or any proper combination thereof. The computer-readable storage medium may be any tangible medium including or storing a program, and the program may be used by or used in combination with an instruction execution system, apparatus or device.

The computer-readable signal medium may include a data signal propagated in a baseband or propagated as a part of a carrier, and carries computer-readable program code. Such a propagated data signal may be in multiple forms, including but not limited to: an electromagnetic signal, an optical signal, or any proper combination thereof. The computer-readable signal medium may alternatively be any computer-readable storage medium other than the computer-readable medium. The computer-readable storage medium may send, propagate or transmit a program used by or used in combination with an instruction execution system, apparatus or device.

The program code included in the computer-readable medium may be transmitted by any suitable medium, including but not limited to: radio, an electric cable, an optical-fiber cable, Radio Frequency (RF), or any proper combination thereof.

Computer program code for executing the operations in the present disclosure may be compiled by using one or more program design languages or a combination thereof. The programming languages include object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer via any type of network, including a Local Area Network (LAN) or a Wide Area Network (WAN), or may be connected to an external computer (for example, connected via the Internet by using an Internet service provider).

The term "terminal device" covers any suitable type of wireless user equipment, such as mobile phones, portable data processing equipment, portable web browsers or vehicle-mounted mobile stations.

Generally speaking, various embodiments of the present disclosure may be implemented in hardware or dedicated circuits, software, logic or any combination thereof. For example, some aspects may be implemented in hardware, while other aspects may be implemented in firmware or software that may be executed by a controller, a microprocessor or another computing device. However, the present disclosure is not limited thereto.

Embodiments of the present disclosure may be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure may represent program steps, or may represent interconnected logic circuits, modules and functions, or may represent a combination of program steps and logic circuits, modules and functions. The computer program may be stored in a memory. The memory may be of any type that is suitable for a local technical environment and may be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A method for determining a time of arrival (TOA), applied to a positioning terminal device in a wireless communication system, comprising:
   receiving a positioning signal from a base station in the wireless communication system;
   performing a mathematical correlation operation on the positioning signal and a local signal to obtain a correlation waveform;
   determining a detection start time on the correlation waveform based on a leading edge detection threshold;
   determining a noise threshold on the correlation waveform, and determining a quasi-TOA according to the detection start time; and
   determining the TOA according to data information in a target area of the correlation waveform and the noise threshold,
   wherein the target area is determined based on the quasi-TOA and a detection length;
   wherein determining the TOA according to data information in a target area of the correlation waveform and the noise threshold comprises:
      determining the data information in the target area of the correlation waveform, the data information comprising: at least one of the following attributes of a maximum data point: amplitude; amplitude change rate; or time, the maximum data point being a data point with a largest amplitude in the target area of the correlation waveform;
      determining the quasi-TOA as the TOA in response to the amplitude of the maximum data point being not greater than the noise threshold; and updating the quasi-TOA in response to the amplitude of the maximum data point being greater than the noise threshold, until no amplitude greater than the noise threshold exists in a target area corresponding to the updated quasi-TOA, and determining the updated quasi-TOA as the TOA.

2. The method of claim 1, wherein determining a detection start time on a correlation waveform based on a leading edge detection threshold comprises:
identifying target data points having an amplitude equal to the leading edge detection threshold on the correlation waveform; and
determining a minimum time among times corresponding to the identified target data points as the detection start time.

3. The method of claim 1, wherein determining a noise threshold on the correlation waveform comprises:
determining a maximum amplitude in the correlation waveform;
determining a noise detection interval in the correlation waveform, the noise detection interval being an interval determined on the correlation waveform based on time, and a distance between a maximum time in the noise detection interval from a time corresponding to the maximum amplitude being greater than or equal to a predetermined distance, and a length of the noise detection interval is a predetermined length; and
determining the noise threshold according to signal amplitudes of the noise detection interval.

4. The method of claim 1, wherein the quasi-TOA is a time corresponding to a first extreme point on the correlation waveform, the first extreme point being a latest extreme point on the correlation waveform at a time earlier than the detection start time; or
the quasi-TOA is a time corresponding to a second extreme point on the correlation waveform, the second extreme point being a latest extreme point on the correlation waveform at a time earlier than the detection start time and with an amplitude smaller than the noise threshold.

5. The method of claim 1, wherein updating the quasi-TOA comprises:
in response to the amplitude change rate at the maximum data point being negative, determining a target time on the correlation waveform as a new detection start time, the target time being a time corresponding to a third extreme point, and the third extreme point being a latest extreme point on the correlation waveform at a time earlier than the time corresponding to the maximum data point;
in response to the amplitude change rate at the maximum data point being positive or the maximum data point being an extreme point, determining the time corresponding to the maximum data point as a new detection start time; and
continuing to select the quasi-TOA to determine an updated quasi-TOA.

6. The method of claim 1, wherein the target area is an interval extending from the quasi-TOA in a time decreasing direction and having a length equal to the detection length.

7. A positioning terminal device in a wireless communication system, comprising:
at least one processor; and
a storage apparatus, configured to store at least one program, wherein
the at least one program, when executed by the at least one processor, causes the at least one processor to implement a method for determining a time of arrival (TOA) comprising:
receiving a positioning signal from a base station in the wireless communication system;
performing a mathematical correlation operation on the positioning signal and a local signal to obtain a correlation waveform;
determining a detection start time on the correlation waveform based on a leading edge detection threshold;
determining a noise threshold on the correlation waveform, and determining a quasi-TOA according to the detection start time; and
determining the TOA according to data information in a target area of the correlation waveform and the noise threshold, wherein the target area is determined based on the quasi-TOA and a detection length;
wherein determining the TOA according to data information in a target area of the correlation waveform and the noise threshold comprises:
determining the data information in the target area of the correlation waveform, the data information comprising: at least one of the following attributes of a maximum data point: amplitude; amplitude change rate; or time, the maximum data point being a data point with a largest amplitude in the target area of the correlation waveform;
determining the quasi-TOA as the TOA in response to the amplitude of the maximum data point being not greater than the noise threshold; and
updating the quasi-TOA in response to the amplitude of the maximum data point being greater than the noise threshold, until no amplitude greater than the noise threshold exists in a target area corresponding to the updated quasi-TOA, and determining the updated quasi-TOA as the TOA.

8. A non-transitory computer-readable storage medium storing a computer program which, when executed by a processor, causes the processor to implement the method for determining a time of arrival (TOA) of claim 1.

9. A non-transitory computer-readable storage medium storing a computer program which, when executed by a processor, causes the processor to implement the method for determining a time of arrival (TOA) of claim 2.

10. A non-transitory computer-readable storage medium storing a computer program which, when executed by a processor, causes the processor to implement the method for determining a time of arrival (TOA) of claim 3.

11. A non-transitory computer-readable storage medium storing a computer program which, when executed by a processor, causes the processor to implement the method for determining a time of arrival (TOA) of claim 4.

12. A non-transitory computer-readable storage medium storing a computer program which, when executed by a processor, causes the processor to implement the method for determining a time of arrival (TOA) of claim 5.

13. A non-transitory computer-readable storage medium storing a computer program which, when executed by a processor, causes the processor to implement the method for determining a time of arrival (TOA) of claim 6.

* * * * *